April 30, 1963     E. A. RALPH     3,087,383
NOSE POSITIONING RISER
Filed June 2, 1961
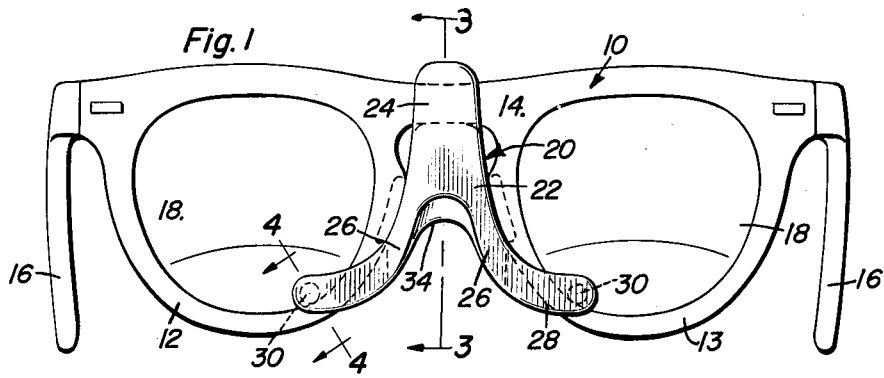
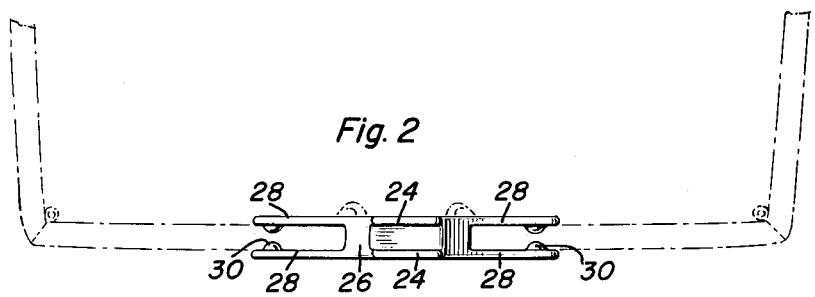
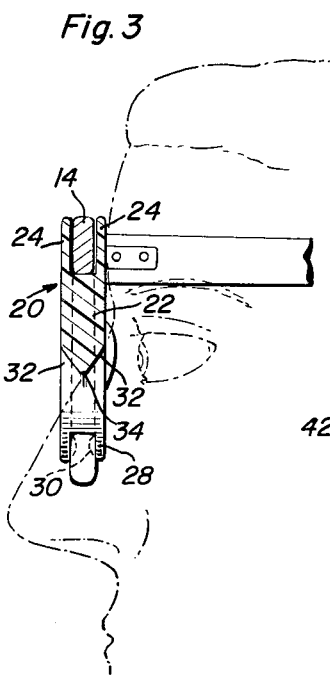
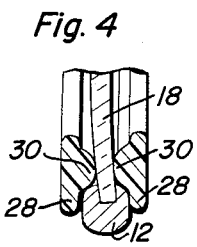
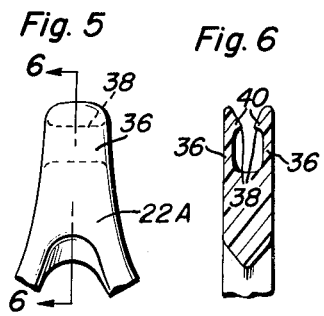
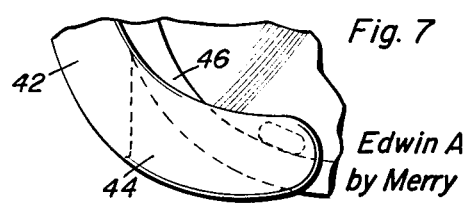
Edwin A. Ralph, deceased
by Merry Ralph, Executrix
INVENTOR.
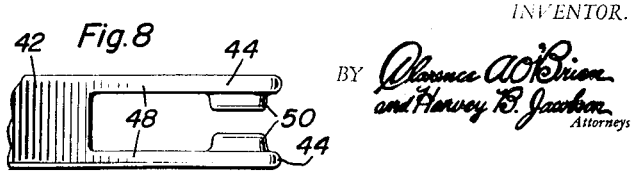

United States Patent Office 3,087,383
Patented Apr. 30, 1963

3,087,383
NOSE POSITIONING RISER
Edwin A. Ralph, deceased, late of Jamestown, N.Y., by Merry Ralph, executrix, Jamestown, N.Y., assignor to Harry W. Grosser, Jamestown, N.Y.
Filed June 2, 1961, Ser. No. 114,561
7 Claims. (Cl. 88—51)

The present invention relates to a readily applicable and removable attachment which, while applicable to rimless eye-glasses is particularly designed and adapted to be applied to components of the frame of present-day spectacles, the principal object of the invention being to elevate the lenses to assume positions in line with the normal or direct line of vision as is unquestionably desirable, at least by many persons, for close work, reading, or sewing, shaving and so on when tilting the head back to bring the reading lenses into position may be undesirable.

It should be pointed out at the inception that the instant invention has to do with a nose positioning riser for bifocal eyeglasses which is broadly and basically the same as the riser covered in prior Patent 2,801,569 of August 6, 1957. Looking toward a prompt and comprehensive grasp of the subject matter hereinafter revealed in detail, the reader might well familiarize himself with the stated patent. To this end, it will be evident that the patented riser has to do with a device or means which will permit selective disposition or support of eye-glasses so elevated in a plurality of different positions laterally to the face of the wearer, that is shifted from side to side with at least one close range lens remaining in the line of vision in all positions to enable the wearer to localize his view.

More in particular Patent 2,801,569 pertains to a body having a recess at the nasal surface thereof to enable the disposition thereof with one so-called corner uppermost and with one side lowermost and approximately horizontal. The uppermost portion has a slot to receive the bridge of the eyeglasses. The lower-end portion has flanges or equivalent spaced parallel grips to embrace corresponding portions of the lens supporting rim. The lower central portion is cutaway to provide a nose rest.

In the instant invention the general and basic characteristics of the patented riser are retained but certain refinements and improvements have been devised and perfected for use. With the improved construction the riser lends itself to production from moldable transparent commercial plastic material which is possessed of reliable impact strength and longevity. Instead of having distinguishable front and rear vertical sides or surfaces the improved riser has duplicate generally planar front and rear sides. Moreover, the arch at the bottom forming the lower end of the body in the improvement is not only arcuate to conformingly fit over the wearer's nose but is V-shaped in cross-section. This simple but important change makes the attachment versatile.

It will be further noted that the furcations forming the attaching and retaining members at the top in the improved construction are preferably provided with detents to insure better retention of the upper part of the attachment once it is secured to the bridge of the frame of the spectacles.

It is also to be noted that the lower part of the riser instead of being bulky is now with less mass and has relatively flexible outwardly and downwardly diverging arms or limbs terminating in fingers which straddle the lens holding rims and wherein the fingers themselves are provided on inner opposed sides with detents.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in front elevation of a pair of conventional spectacles showing the improved attachment and the manner in which it is constructed and used.

FIG. 2 is a top or edge view looking downwardly on FIG. 1 with the attachment removed and the frame appearing in phantom lines.

FIG. 3 is a section on the vertical line 3—3 of FIG. 1 looking in the direction of the arrows.

FIG. 4 is a section on the line 4—4 of FIG. 1 on a slightly enlarged scale.

FIG. 5 is a view directed to the upper end portion of the attachment showing a modification in construction.

FIG. 6 is a section on the vertical line 6—6 of FIG. 5.

FIG. 7 is also a fragmentary view on a larger scale showing a slight modification in the detents carried by the fingers.

FIG. 8 is a view illustrating the detents by themselves.

Reference will be made first to FIGS. 1 to 4 inclusive. In FIG. 1 the spectacle frame, generally speaking, is denoted by the numeral 10 and embodies left and right rims 12 and 13 having upper portions joined by a customary type nose bridge 14. The temples are denoted at 16. The lenses are denoted at 18. The over-all unit or attachment which comprises the aforementioned riser is denoted by the numeral 20 and it is made from transparent moldable commercial plastic material of an appropriate grade. The main body portion 22 which may perhaps be referred to as a block is vertically elongated and the upper end portion is bifurcated to define spaced parallel furcations or grips 24 of the shape seen in FIG. 3 and which straddle the nose bridge in the manner shown. The lower end portion of the body is provided with a pair of outwardly and downwardly curved arms or limbs 26 which are duplicated in construction. These limbs are shaped to conform to the marginal contours of the rims 12 and 13 and they are of a length to provide the retaining function illustrated. More specifically, the free lower end portions are bifurcated and the furcations define fingers 28 which are curved to straddle the rim portion and are provided on the interior sides with the ball-like bosses 30 constituting detents and which not only engage the peripheral portion of the rim but actually contact opposite front and rear surfaces of the lens as detailed in FIG. 4.

The part of the body which is referred to as a recess in the prior patent is here designated as the lower end portion and while it may be considered as recessed it is thought of here as an existing crotch between the connected upper ends of the limbs 26 with the lower part of the body 22. Thus the limbs and this crotch together define a highly satisfactory and comfortable nose rest. More particularly, the crotch itself is V-shaped in cross-section as shown in FIG. 3. In fact, the beveled surfaces are disposed at approximate 45° angles as denoted at 32 and the ridge or crest 34 is nicely rounded and shaped to rest on the nose in the manner illustrated in phantom lines in FIG. 3. This V-shaped cross-section makes the attachment reversible and overcomes one of the objections to the prior patented construction. Also it will be evident that here the arms 26 are attenuated, so to speak, so that they are more readily conformable to the role which they are intended to perform. Furthermore, this construction lends itself to molding so that the flexible fingers 28 with their detents 30 fit nicely into place thus providing a three-point connection of the attachment with the component parts of the spectacles frame.

With reference to the modification seen in FIGS. 5 and 6 the upper end portion only of the body 22a is involved. In other words, this upper end is bifurcated and the furcations are denoted at 36 and they are slightly flexibly bendable and have detents at 38 with the surfaces 40 suitably bevelled to facilitate application of the detent equipped ends of the furcations 36. The other features (not detailed) are the same as already described.

Also the slight modification seen in FIG. 7 is merely shown to bring out the fact that the detents do not have to be ball-like or part spherical. In fact, in some instances, the arm or limb 42 is bifurcated and the furcations are denoted at 44 and straddle the rim 46 and here again the interior surfaces 48 of the fingers have bosses or detents 50 which are elongated. These elongated detents are somewhat ovate in shape as shown in dotted lines in FIG. 7.

It is believed that a careful consideration of the specification in conjunction with the accompanying drawings, the claims, and with reference to the prior Patent 2,801,569, the reader will have obtained an adequate understanding of the patent and also will better understand the instant invention and how it is used and performs and will full well appreciate the distinctions and advantages under advisement. Under the circumstances a more detailed description is believed to be unnecessary.

Minor changes in shape, size, materials and rearrangement of component parts may be resorted to in actual practice without departing from the spirit of the invention with the scope of the invention as claimed.

What is claimed as new is as follows:

1. A readily attachable and detachable optionally usable riser attachment for the lens-equipped rims and nose bridge of the frame of bifocal eyeglasses comprising a body made of moldable transparent plastic material having upper and lower portions and planar forward and rearward duplicate surfaces, said body being shaped and adapted to occupy a vertical position of use between the left and right lens-equipped rims below and beneath said nose bridge, the upper end of said upper portion being bifurcated and providing furcations which are adapted to straddle the front and rear vertical surfaces of said nose bridge in a manner to partially retain the riser in its intended place of use, the lower portion of said body having duplicate stabilizing and retaining limbs which are disposed in a plane common with each other and also with the plane of said body and extending downwardly and outwardly in divergent paired relationship and being provided with resilient fingers designed and adapted to straddle cooperating marginal edge portions of the respective lens rims and lenses therein, the lower end of said lower portion of said body having an arcuate nose rest, said nose rest having reversible surfaces and the overall riser being reversible.

2. A readily attachable and detachable riser for use on bifocal eyeglasses comprising a body having upper and lower end portions and planar forward and rearward vertical surfaces, said body shaped and adapted to occupy a position of use between the left and right lenses and also below the usual nose bridge of the eyeglasses, the upper end of the upper portion being bifurcated and providing furcations, the latter adapted to straddle the front and rear vertical surfaces of said nose bridge in a manner to partially retain the riser in its intended place of use, the lower portion having attaching and retaining limbs terminating in paired fingers which straddle cooperating marginal edge portions of the lenses, and the lower end of said lower portion having an arcuately curved nose rest which is V-shaped in cross-section to provide downwardly beveled surfaces which render the over-all attachment reversible.

3. The structure defined in claim 2 and wherein the fingers of each pair are disposed in general spaced parallel relationship and have inner opposed faces, said faces terminating in oppositely disposed detents.

4. The structure defined in claim 2 and wherein said fingers are disposed in generally spaced parallel relationship and have inner opposed faces, said faces terminating in oppositely disposed detents, said detents being hemispherical and generally ball-like in shape.

5. The structure defined in claim 2 and wherein said fingers are disposed in generally spaced parallel relationship and have inner opposed faces, said faces terminating in oppositely disposed detents, said detents being of elongated ovate form.

6. A readily attachable and detachable riser for use on bifocal eyeglasses comprising a vertically elongated body having upper and lower portions and corresponding planar surfaces which are reversible, said body being shaped and adapted to occupy a position of use between the left and right lenses of said eyeglasses below and generally coplanar with the usual nose bridge of said eyeglasses, the upper end of the upper portion of said body being bifurcated and providing opposed furcations to straddle the front and rear vertical surfaces of said nose bridge in a manner to partially retain the riser in its intended place of use, the lower portion having body attaching and retaining limbs said limbs being duplicated in construction and diverging downwardly and outwardly, the outer end of each limb terminating in a pair of opposed resilient fingers which straddle cooperating marginal edge portions of the respective lenses, and the lower end of said lower portion having a nose rest with duplicate reversible selectively usable surfaces which slope upwardly and outwardly, the opposed interior surfaces of said furcations at the upper end being generally flat and in spaced parallel relationship.

7. The structure defined in claim 2, and extreme upper ends of said furcations being beveled and flared outwardly to facilitate application and removal thereof and being further provided with opposed detents cooperable with said bevelled upper ends.

References Cited in the file of this patent
UNITED STATES PATENTS 2,612,076   Dietz _____ Sept. 30, 1952
2,801,569   Ralph _____ Aug. 6, 1957